US006553358B1

(12) United States Patent
Horvitz

(10) Patent No.: US 6,553,358 B1
(45) Date of Patent: Apr. 22, 2003

(54) DECISION-THEORETIC APPROACH TO HARNESSING TEXT CLASSIFICATION FOR GUIDING AUTOMATED ACTION

(75) Inventor: Eric Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/295,088

(22) Filed: Apr. 20, 1999

(51) Int. Cl.[7] ................................................. G06N 5/02
(52) U.S. Cl. .............................. 706/45; 705/39; 707/10
(58) Field of Search ............................ 707/10; 706/45; 705/39

(56) References Cited

U.S. PATENT DOCUMENTS

| | | | | |
|---|---|---|---|---|
| 5,696,965 | A | * 12/1997 | Dedrick | 707/10 |
| 5,864,848 | A | 1/1999 | Horvitz et al. | 707/6 |
| 5,870,723 | A | * 2/1999 | Pare, Jr. et al. | 705/39 |
| 6,151,600 | A | * 11/2000 | Dedrick | 707/10 |

OTHER PUBLICATIONS

"Principles of Mixed–Initiative User Interfaces"; Eric Horvitz; Microsoft Research; Aug. 27, 2000.
U.S. patent application Ser. No. 09/055,477, filed Apr. 6, 1998.
U.S. patent application Ser. No. 08/684,003, filed Jul. 19, 1996.
U.S. patent application Ser. No. 09/197,159, filed Nov. 20, 1998.
U.S. patent application Ser. No. 09/197,158, filed Nov. 20, 1998.
U.S. patent application Ser. No. 09/197,160, filed Nov. 20, 1998.
Judea Pearl, Probabilistic Reasoning in Intelligent Systems: Networks of Plausible Inference (ISBN 1558604790), Apr. 1997.
Eric Horvitz, Matthew Barry, Display of Information for Time–Critical Decision–Making, Proceedings of the Eleventh Conference on Uncertainty in Artificial Intelligence, Montreal, Aug. 1995.
Eric Horvitz, Jack Breese, David Heckerman, David Hovel, Koos Rommelse, The Lumiere Project: Bayesian User Modeling for Inferring the Goals and Needs of Software Users, Proceedings of the Fourteenth Conference on Uncertainty in Artificial Intelligence, Madison, WI, Jul. 1998, Morgan Kaufmann Publishers, pp. 256–265.

(List continued on next page.)

Primary Examiner—Wilbert L. Starks, Jr.
(74) Attorney, Agent, or Firm—Amin & Turocy, LLP

(57) ABSTRACT

A decision-theoretic approach for guiding automated actions. In one embodiment, a computer-implemented method first determines a text to analyze. The method then determines an action probability based on the text. Words and phrases as well as information in special fields, such as distinctions and patterns in the header of email, observations about recent user activity, and organizational information are considered in classification. Based on the inferred probability that a user has a goal under consideration, the method selects one of the following options: (1) inaction, (2) automatic action, or (3) suggested action with user approval. Upon the method selecting either the (1) automatic action option or the (2) suggested action with user approval option—the latter also in conjunction with receiving actual user approval—the method performs an action based on the text.

46 Claims, 7 Drawing Sheets

OTHER PUBLICATIONS

Daivd Heckerman and Eric Horvitz, Inferring Informational Goals from Free–Text Queries: A Bayesian Approach, Proceedings of the Fourteenth Conference on Uncertainty in Artificial Intelligence, Madison, WI, Jul. 1998, Morgan Kaufmann Publishers, pp. 230–237.

Susan Dumais, John Platt, David Heckerman, Mehran Sahami, Inductive Learning Algorithms and Representations for Text Categorization, Proceedings of ACM–CIKM98, Nov. 1998.

Ben Shneiderman, Pattie Maes, Direct Manipulation vs Interface Agents: Excerpts from debates at IUI 97 and CHI 97, interactions, Nov.–Dec. 1997, pp. 42–61.

M. Sahami, S. Dumais, D. Heckerman, E. Horvitz, A Bayesian Approach to Filtering Junk E–mail, AAAI Workshop on Text Classification, Jul. 1998, Madison, Wisconsin, AAAI Technical Report WS–98–05.

* cited by examiner

DECISION-THEORETIC APPROACH TO HARNESSING TEXT CLASSIFICATION FOR GUIDING AUTOMATED ACTION

RELATED APPLICATIONS

This application is related to the coassigned and cofiled applications entitled "Systems and Methods for Directing Automated Services for Messaging and Scheduling", and "Learning by Observing a User's Activity for Enhancing the Provision of Automated Services", both of which are hereby incorporated by reference.

FIELD OF THE INVENTION

This invention relates generally to decision theory, and its application to automated decision making when used in conjunction with automated classification systems such as text classification systems, and more particularly to utilizing decision theory for guiding automated user interface, communication, and system actions.

BACKGROUND OF THE INVENTION

Computer applications such as messaging and scheduling applications have become important applications in many computer users' lives. Messaging programs generally allow a user to send and receive electronic mail (e.g., messages) to and from other computer users, for example, over a local- or a wide-area network, or over an intranet, extranet, or the Internet. Online schedule and calendar programs generally allow a user to create and to track appointments in a calendar. More sophisticated scheduling programs allow one user to schedule a group meeting with other computer users—checking the latter users' schedule availability, and receiving confirmation from the users upon them accepting or rejecting the group meeting appointment.

Within the prior art, however, messaging and scheduling programs are generally not very well integrated, even if they are components within the same computer program. For example, a user may receive a message from a colleague stating "Looking forward to seeing you at 2 on Thursday." Generally, however, the prior art does not provide for automatically directing the scheduling program to make a meeting appointment at 2 p.m. on Thursday. Instead, typically the user who has received the message has to open the scheduling program, access Thursday's calendar, and manually enter an appointment at 2 p.m. on Thursday's calendar. Because of the many steps required to go from reading the message within the messaging program to entering the information into the scheduling program, many users choose not to even use scheduling programs, or to only use them sparingly.

For these and other reasons, there is a need for the present invention.

SUMMARY OF THE INVENTION

The invention relates to the use of decision theory for directing automated actions. In one embodiment, a computer-implemented method first determines a text to analyze. The method then determines an action probability based on the text and/or contextual information (e.g., information regarding recent user activity, organizational information, etc.), and based on the action probability, selects one of the following options: (1) inaction, (2) automatic action, or (3) suggested action with user approval. Upon the method selecting either the (1) automatic action option or the (2) suggested action with user approval option—the latter also in conjunction with receiving actual user approval—the method performs an action based on the text.

Embodiments of the invention provide for advantages not found within the prior art. For example, in the context of scheduling appointments based on the text input, the method can perform an action based on the text, upon determining the action probability of the text. Based on the action probability the method determines if it should do nothing (i.e., corresponding to a low probability), do something automatically (i.e., corresponding to a high probability), or suggest an action, but do not do it automatically (i.e., corresponding to a medium probability). Thus, one embodiment of the invention effectively links scheduling with messaging automatically. It is noted that the invention itself is not limited to the application of scheduling and messaging, however; for example, other actions that can be based on the text analyzed including extracting contact information and storing the information in an address book, forwarding, paging, routing and moving, as those of ordinary skill within the art can appreciate.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
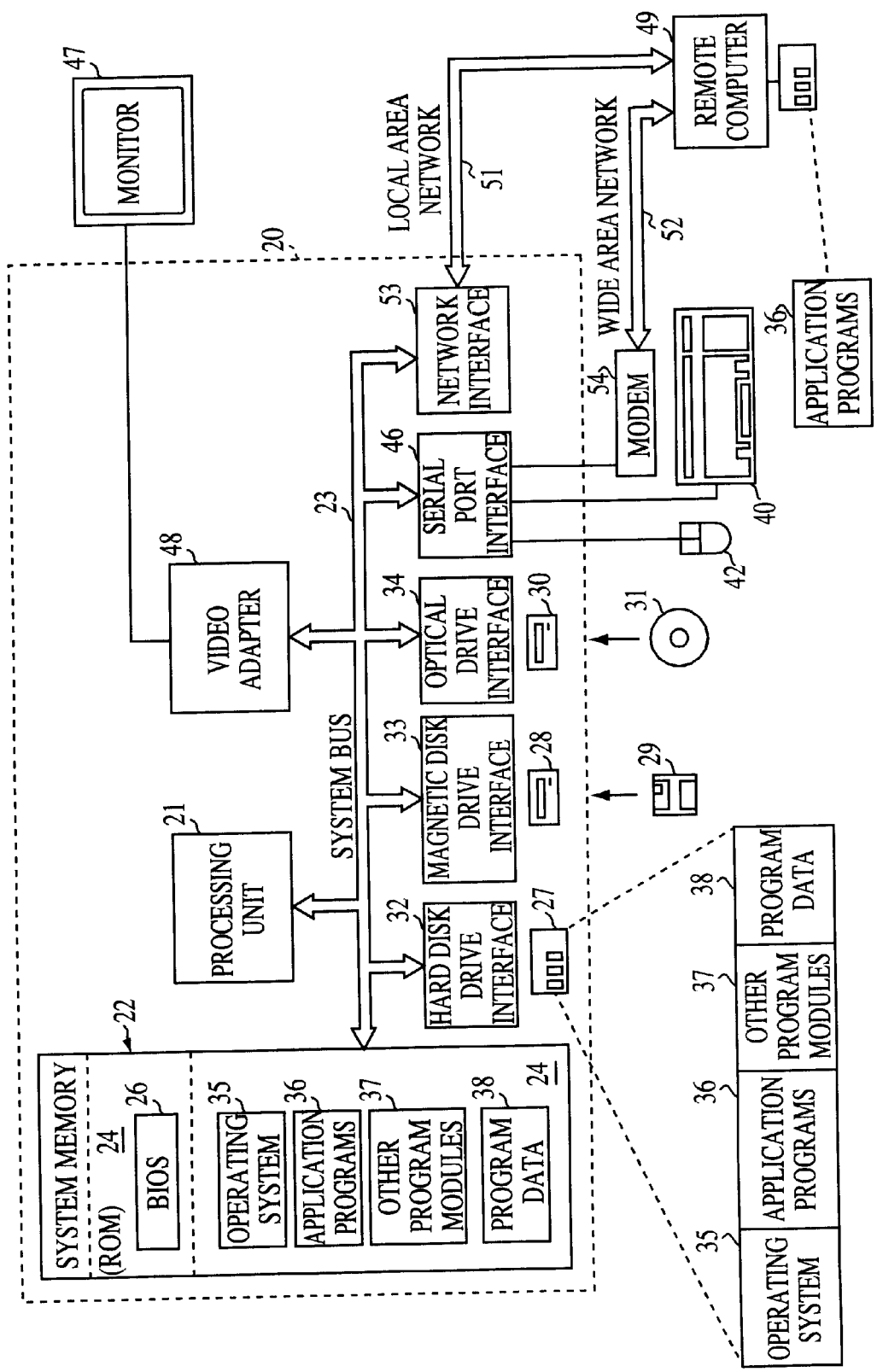
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Illustrative Example

Figure 2:
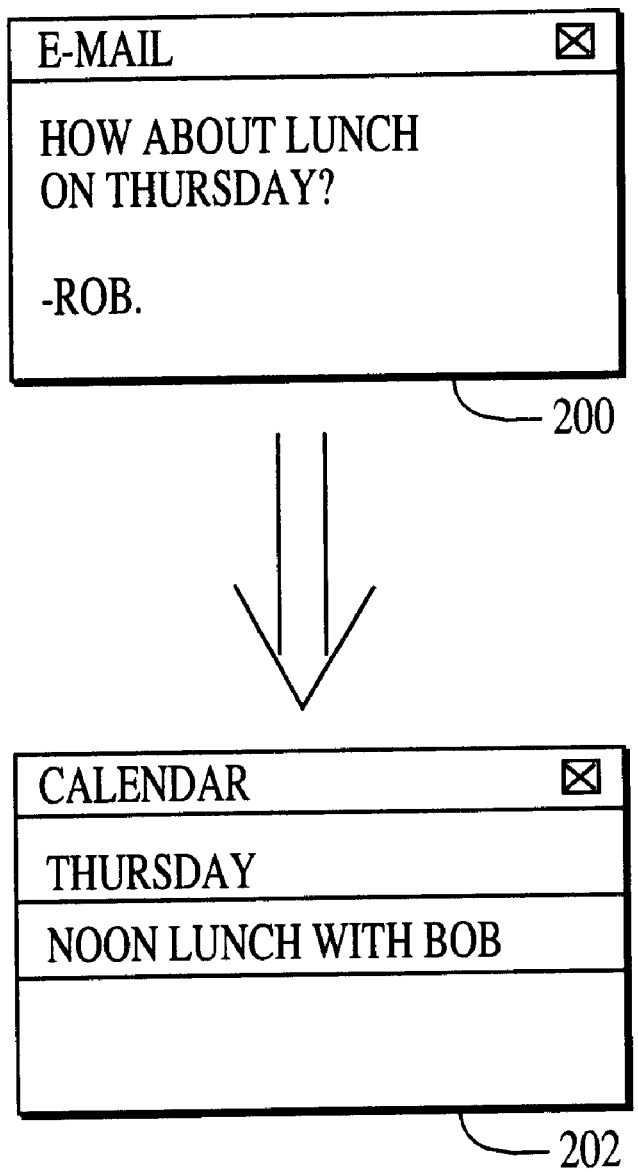
FIG. 2 is a diagram of an example of directed scheduling, according to an embodiment of the invention.

Prior to describing methods and systems of embodiments of the invention, an illustrative example according to an embodiment of the invention is first described in this section of the detailed description, with reference to FIG. 2. As stated in the summary, embodiments of the invention are not limited to any particular application. For example, in different embodiments of the invention, such applications include scheduling appointments, scoping calendars to appropriate ranges, forwarding messages, and sending various alerts to user. The example described in this section specifically relates to directing automated services for messaging and scheduling. Thus, in the example of FIG. 2, an electronic mail is shown in a window 200. The window 200 may be part of an electronic mail program, such as those available within the art. The electronic mail has the text, from a user named Bob, reading "How about lunch on Thursday?". In one embodiment of the invention, a window 202 of the scheduling program appears, such as scheduling programs available within the art. The embodiment of the invention causes a scheduling entry to be entered in the user's calendar for Thursday, at noon, reading "Lunch with Bob."

In other words, the embodiment of the invention of FIG. 2 determines the action probability of the text of the electronic mail in the in the window 200, and makes a decision for automatic scheduling based on the probability of the message. It then performs a scheduling action—parsing the text of the electronic message, and entering the entry in the scheduling program as is shown in the window 202. Thus, the embodiment of the invention is able to recognize that "Lunch" means about noon in time, and that "lunch on Thursday" in general has a high scheduling probability (that is, a high probability that the electronic mail relates to a scheduling task).

Those of ordinary skill within the art can appreciate that the example of FIG. 2 is meant only to illustrate how embodiments of the invention can operate, for purposes of understanding operation of embodiments of the invention, and does not represent limitations of the invention itself.

Methods

In this section of the detailed description, computer-implemented methods according to varying embodiments of the invention are described. The computer-implemented methods are desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

Figure 3:
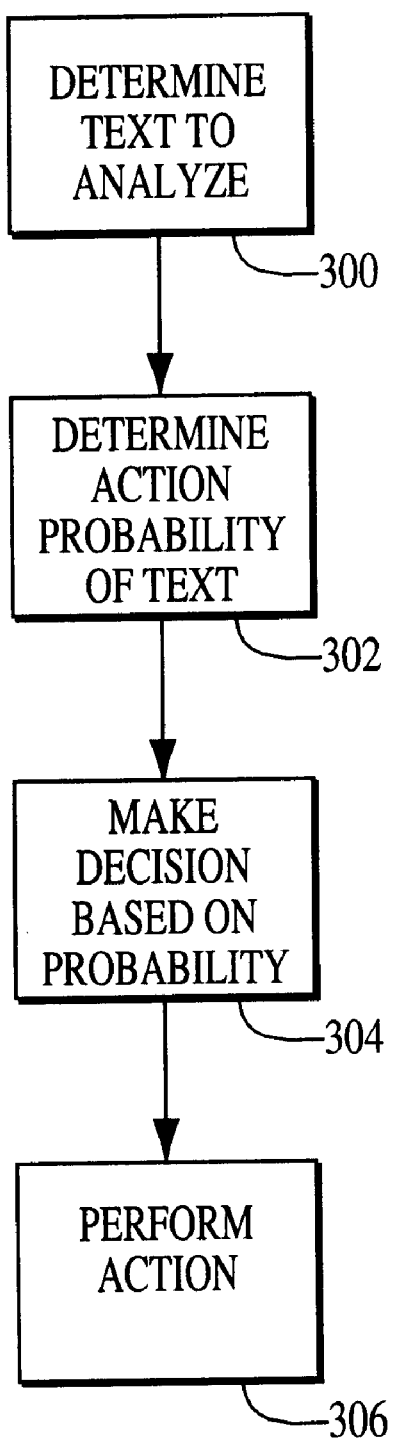
FIG. 3 is a flowchart of a method according to an embodiment of the invention.

A general method of an embodiment of the invention is first described in conjunction with FIG. 3, which is a flowchart of a method according to an embodiment of the invention. In 300, the method specifically determines a text to analyze. For example, the text can be a message of an electronic mail program that currently has focus. A message having focus is the message of the window that is currently open within a graphical user interface operating system. For example, ten windows may be open on the screen, such that each window has an electronic mail message therein. The window that is currently selected by the user is the window that is currently active, and thus the window that has focus. It is this window that the method selects in 300 in one embodiment of the invention, although the invention is not so limited. As another example, the text to be analyzed can be user input—for example, by the user copying or cutting text to a clipboard, as known within the art, and then invoking 300 of the method based on this text. The invention is not so limited.

In 302, the method next determines an action probability based on the text. The action probability of the text generally refers to the probability that the text relates to an action task. For example, in the context of scheduling programs, in general, a message reading "Good luck, Bob, on your new venture" has a low action probability, since it does not have subject matter relating to a scheduling task. Conversely, for example, in the context of scheduling programs, in general, a message reading "The next departmental meeting will be held at 5 P.M. on October 23" has a high action probability, since it does have subject matter relating to a scheduling task. The probability that a user might like to schedule an appointment based on the content of the email is not only influenced by the patterns of text in the body of the message but also by other information, such as organizational information and patterns of information in the header. For example, the probability of a user having the goal of scheduling an appointment based on a message addressed only to the user might be typically greater than the probability of having such a goal with a message addressed to a large group of users. Likewise, a message from someone's manager about a meeting addressed only to a user or to a small group might be associated with a higher probability of the user wishing to schedule an appointment based on the information contained in the associated message than if the message was from another person in the organization, or sent to a large group of people.

In other words, the action probability of a text is the probability that the user's goal for the text is to perform an action based on the message—in the case of the example, either to open and review one's calendar for the times represented by the text of the message, to schedule an appointment, or to set up a group meeting. In one embodiment of the invention, the action probability is determined in 302 by passing the text as input to a model such as a text classification system such as a one based on a classifier provided by a Support Vector Machine, as are known within the art. In particular, in one embodiment of the invention, the model utilized is as described in U.S. Pat. No. 5,864,848, issued Jan. 26, 1999, which is hereby incorporated by reference. In another embodiment of the invention, the model utilized is as described in the previously filed and coassigned case entitled "METHODS AND APPARATUS FOR BUILDING A SUPPORT VECTOR MACHINE CLASSIFIER," Ser. No. 09/055,477, filed on Apr. 6, 1998, which is also hereby incorporated by reference. In addition, further information regarding the training of these models for the particular application in this case is later described in this application.

Once the action probability of the text has been determined in 302, then in 304, the method makes a decision based on the probability. More specifically, the method selects one of three options. First, the method can select inaction—that is, not to perform any action based on the message. Second, the method can select to engage the user in a dialog about taking an action, and seek user approval before invoking action—that is, to perform an action based on the text, but only after receiving confirmation from the user that the method should go ahead and perform the action. Third, the method can select automatic action—that is, to perform an action based on the text, automatically, without first receiving confirmation from the user. It is noted that this is only in one embodiment; in other embodiments of the invention, more than three options are possible, as those of ordinary skill within the art can appreciate.

In one embodiment of the invention, the method determines which of the three options to select based on probability thresholds associated with the boundaries among the three options. A first probability threshold is associated with the inaction | action with user approval boundary, and a second probability threshold is associated with the action with user approval | automatic action boundary. If the action probability is less than the first probability threshold, then the method selects inaction. If the action probability is greater than the first probability threshold but less than the second probability threshold, then the method selects action with user approval. Finally, if the action probability is greater than the second probability threshold, then the method selects automatic action.

An example is illustrative in understanding the probability thresholds. For example, the first probability threshold can be 0.4, while the second probability threshold can be 0.7. If a text has an action probability of 0.6, then the method selects action with user approval. In general, the inaction option relates to texts not having subject matter with high action probabilities; the action with user approval option relates to texts having subject matter with medium action probabilities; and, the automatic action option relates to texts having subject matter with high action probabilities.

The invention is not limited as to the manner by which the probability thresholds are determined. In one embodiment, they are set directly by users. For example, with respect to the second probability threshold, the user may be intolerant of potentially erroneous inferences leading to unwanted dialog or automatic actions, and thus not want automatic action to occur unless the text being analyzed has a very high threshold probability for action, say over 90%. Conversely, for example, a user becoming more accustomed and trusting of automatic action may not want to be bothered with dialogs seeking confirmation of suggested actions, and thus may set the second probability threshold to 70%, which means that texts having probability thresholds over 70% are automatically scheduled.

In other embodiments of the invention, the probability thresholds of the boundaries among the options that can be selected by the method are set in accordance with decision theory, based on a cost/benefit analysis to provide for probability thresholds. This is described in more detail later in the detailed description.

Finally, in 306, the method performs an action based on the decision made in 304. That is, if automatic action was selected in 304, or if action with user approval was selected in 304 and actual user approval was received, then in 306 the action is performed. Conversely, if inaction was selected in 304, or if action with user approval was selected in 304 and actual user approval was not received, then in 306 no action is performed. The invention is not limited to a particular action or set of actions. Examples of actions that are amenable to the invention include scheduling appointments, scoping of calendars to appropriate ranges, forwarding messages, and sending various alerts to users; other examples include forwarding, paging, routing and moving of or based on texts such as electronic mail messages, as those of ordinary skill within the art can appreciate. Other examples include extraction of contact information, and extraction of maps or directions. In one specific embodiment relating to scheduling appointments, the scheduling action can be performed in a manner balancing precision and confidence of the action, as is particularly described in the copending, cofiled and coassigned application entitled "Systems and Methods for Directing Automated Services for Messaging and Scheduling", which has already been incorporated by reference.

Figure 4:
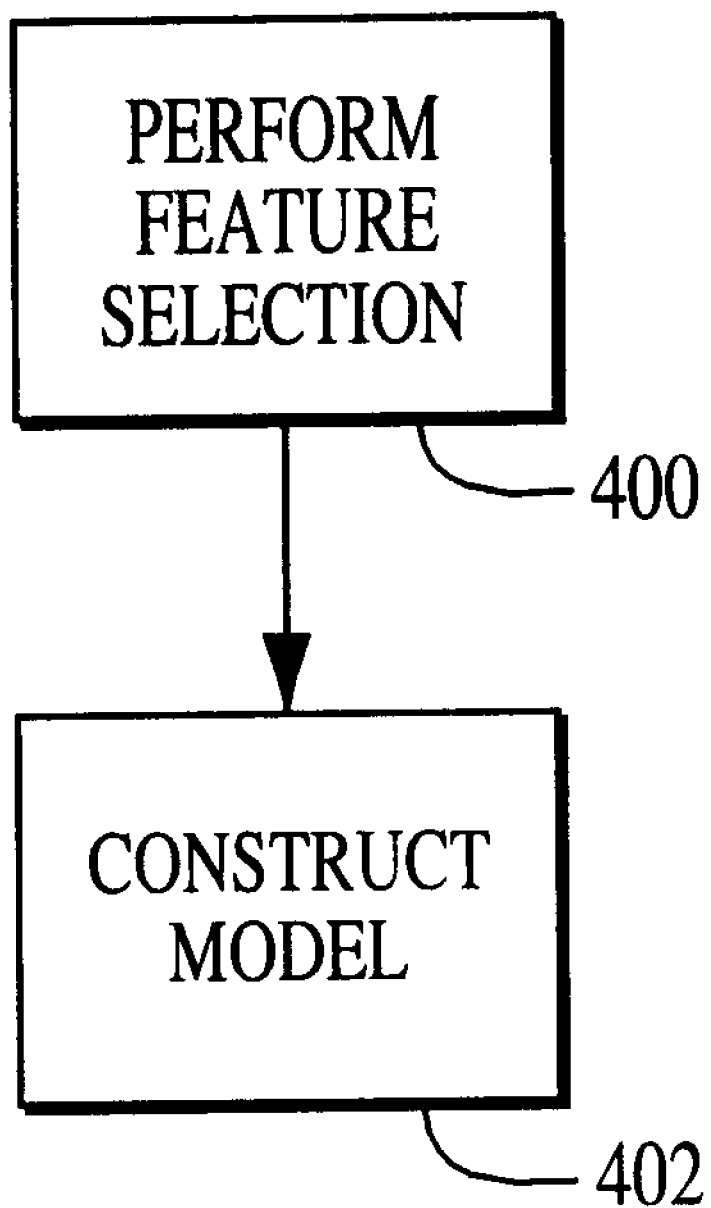
FIG. 4 is a flowchart of a method to construct a model utilized to determine an action probability of a text, according to an embodiment of the invention.

Referring next to FIG. 4, a flowchart of a method to train a classification system that takes into consideration text of email or other documents, as well as such information as distinctions and patterns in an email header such as sender and recipient information, information about the organizational relationships between the user and the sender, and contextual information, such as recent user activity in scanning the message. The classification system can be based on the use of different methods for automated classification. The embodiment of the invention, employs a Support Vector Machine for use in determining an action probability of a message. For example, the flowchart of FIG. 4 can be used to train a model that is used by 302 of FIG. 3 to determine a action probability of a message. That is, the flowchart of FIG. 4 can be used to initially generate the model used by 302 of FIG. 3. As has been stated, text classification systems and support vector machines are known within the art. Therefore, description of the method of FIG. 4 is specifically geared towards description of adaptation of such models for the applications used herein, as those of ordinary skill within the art can understand.

In 400, a feature selection phase is performed. Feature selection generally is known within the art. The feature selection phase is used to identify features to be used in a classification model that maximally discriminates between text that should be acted upon, and text that should not be acted upon. In one embodiment, this is accomplished by training the model. That is, a number of texts based on which action is to occur (e.g., 500 texts) are input into the feature selection phase, such that the phase knows a priori that the texts are such that action is to occur, and a number of texts based on which action is not to occur (e.g., 500 texts) are input into the feature selection phase, such that the phase knows a priori that the texts are such that action is not to occur. Thus, the model can then determine a set of features that offer a maximum discrimination between those texts that are action related, and those texts that are not action related.

In addition, in one embodiment of the invention, feature selection is enhanced beyond consideration of single words through an initial seeding with domain-specific knowledge about potentially discriminating phrases and patterns of text, header information, and organizational information that may be useful for discrimination. The domain-specific knowledge can include words and phrases that typically are associated with action-related texts. For example, in the context of scheduling, such multi-word phrases may include " . . . get lunch," "let's meet," "how would [DAY] be," " . . . to meet with," etc. A list of such words and phrases that are used in one specific embodiment of the invention in the context of scheduling is provided in the cofiled, coassigned, and copending application entitled "Systems and Methods for Directing Automated Services for Messaging and Scheduling", which has already been incorporated by reference. Those of ordinary skill within the art understand how such domain-specific knowledge can be used to seed feature selection to provide for maximum discrimination between action-related and non-action-related texts.

Next, in 402, once feature selection has been accomplished in 400, a model-construction phase is performed based on the feature selection. That is a model, such as a text classification system based on a support vector machine, as known within the art, is constructed, based on the feature selection accomplished in 400. The construction of such systems and machines, and such models generally, is known within the art.

Beliefs, Goals, and Actions

In this section of the detailed description, information is provided about inferring beliefs about a user's goals, and determining automated actions to take based on a user's goals, that can be utilized in conjunction with embodiments of the invention. More specifically, description is provided as to how decision theory and cost-benefit analysis in particular can be utilized in conjunction with embodiments of the invention, as has been described. Some portions of this description are presented in conjunction with the specific application and/or context of scheduling appointments in a calendar; however, the invention is not so limited to such an application and/or context, as has already been stated.

A component of inferring beliefs about a user's intention is to develop models for assigning likelihoods to alternate user intentions. In the prior art, probabilistic models of a user's goals have been employed to continue to infer the probability of alternate feasible goals as a function of observables including the current program context, a user's sequence of actions, and choice of words used in a query. Also within the prior art, Bayesian network models have been utilized.

In one embodiment of the invention, a model that is used to make decisions about actions is a text classification system, such as a naive Bayesian text classifier, a text classification system based on support vector machine analysis, and an efficient linear support vector machine approximation. In particular, these models are described in S. T. Dumais, J. Platt, D. Heckerman and M. Sahami, "Inductive Learning Algorithms and Representations for Text Categorization," Proceedings of ACM-CIKM98, November 1998, which is hereby incorporated by reference, and in J. Pearl, Probabilistic Reasoning in Intelligent Systems: Networks of Plausible Inference, Morgan Kaufmann Publishers: San Francisco, 1991 (ISBN 1558604790), which is also hereby incorporated by reference. These models are also described in the reference M. Sahami, S. Dumais, D. Heckerman, E. Horvitz, A Bayesian Approach to Junk E-Mail Filtering, AAAI Workshop on Text Classification, July 1998, Madison, Wis., AAAI Technical Report WS-98-05, which is hereby incorporated by reference.

Text-classification methods in particular are used for learning and reasoning reason about the likelihood of user goals within a context. For the context of a user reviewing electronic mail, for example, and the task of calendaring and scheduling, it is desirable to assign a likelihood that an electronic mail message that has just received the focus of attention is in the goal category of "User will wish to schedule or review a calendar for this electronic mail" versus the goal category of "User will not wish to schedule or review a calendar for this electronic mail" based on the content of the message. A linear support vector machine text classifier thus is built by training the system on a set of messages that are calendar relevant and calendar irrelevant, such that, at run-time, for each message being reviewed, the classifier outputs the likelihood that the user will wish to bring up a calendar or schedule an appointment.

Next, given the beliefs about a user's goal, a decision must be made as to whether an automated action should be taken. From the perspective of decision theory, decisions about action versus inaction are directed by expected value. Autonomous actions are only taken when they have greater expected value than inaction to the user, taking into consideration the costs, benefits, and uncertainties of a user's goal.

The probability of goals of a user given observed evidence can be written p(G|E). The probability that a user wishes to schedule is thus computed from evidence in patterns of text contained in a message that has been recently opened. For decisions about action versus inaction, there are four deterministic outcomes: either the user has the goal being considered or does not have the goal, and for each of these states of user intention, an action either is taken or note taken. A measure of the value associated with each outcome thus is mapped to a utility on a zero to one scale, such that the utilities are defined as follows:

u(A, G): the utility of taking action A when goal G is true u(A, not G): the utility of taking action A when goal G is not true u(not A, G): the utility of not taking action A when goal G is true, and u(not A, not G): the utility of not taking action A when goal G is not true The expected utility of taking autonomous action to assist the user with an action given observed evidence, u(A|E), is computed by combining the utilities of the outcomes for the case where the user desires service and does not desired a service, weighted by the probability of each outcome, as follows, $$u(A|E)=p(G|E)u(A, G)+p(\text{not } G|E)u(A, \text{not } G).$$

This equation can be rewritten in terms of p(G|E), by noting that p(G|E)=1−p(not G|E).

Thus, the expected utility of providing autonomous service is, $$u(A|E)=p(G|E)u(A|G)+[1-p(G|E)]u(A, \text{not } G).$$

The expected utility of not taking autonomous action to assist the user, u(not A|E) is, $$u(\text{not } A|E)=p(G|E)u(\text{not } A, G)+[1-p(G|E)]u(\text{not } A, \text{not } G).$$

Figure 6:
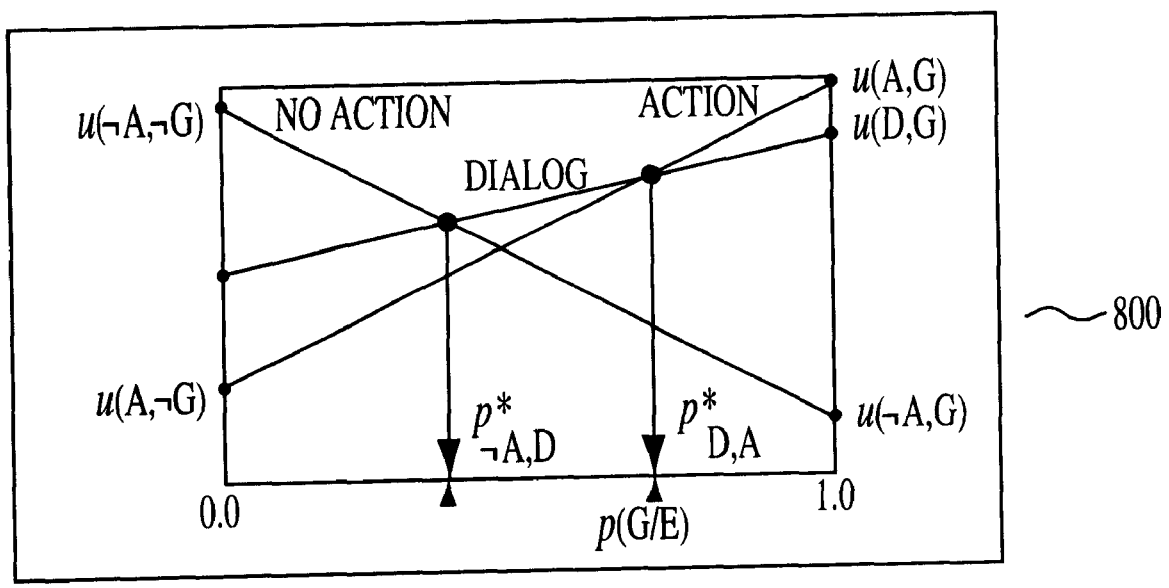
FIG. 6 is another graph in accordance with an application of decision theory that can be utilized in conjunction with embodiments of the invention; and, FIG. 7 is a diagram of a system according to an embodiment of the invention.

The implications of these equations for the expected value of acting and not acting can be visualized, by plotting the lines they define, as shown in FIG. 6. Graph 600 of FIG. 6 is such that where the horizontal represents the probability the user has a goal, ranging from zero to one. The vertical axis indicates the expected value of the system's response. The two outcomes displayed on the right vertical axis have a value associated with p(G|E)=1.0– the user indeed having the goal under consideration. The outcomes listed on the left vertical axis indicate the value of the outcomes when p(G|E)=0. The expected value of acting for intermediary probabilities of p(G|E) is a line joining the two deterministic outcomes associated with taking action. The expected value of not acting is a similar line joining the two outcomes associated with inaction.

It is noted that the lines cross at a specific probability of the user having a goal. At this threshold probability, referred to as p*, the expected value of action and inaction are equal. The best decision to make at any value of p(G|E) is the option associated with the greatest expected value at that likelihood of a user having the goal. Inspection of the graph 600 shows that it is better for the user to act if the probability of a goal is greater than p* and to refrain from acting if the probability is less than p*. The threshold probability for any four utilities can be computed by setting the above two equations equal to one another and solving for p(G|E). Given four values associated with the four outcomes of interest, a system need only to check whether the probability of the goal is greater or less than such a threshold probability to decide on whether it is in the best interest of the user to invoke a service.

Figure 5:
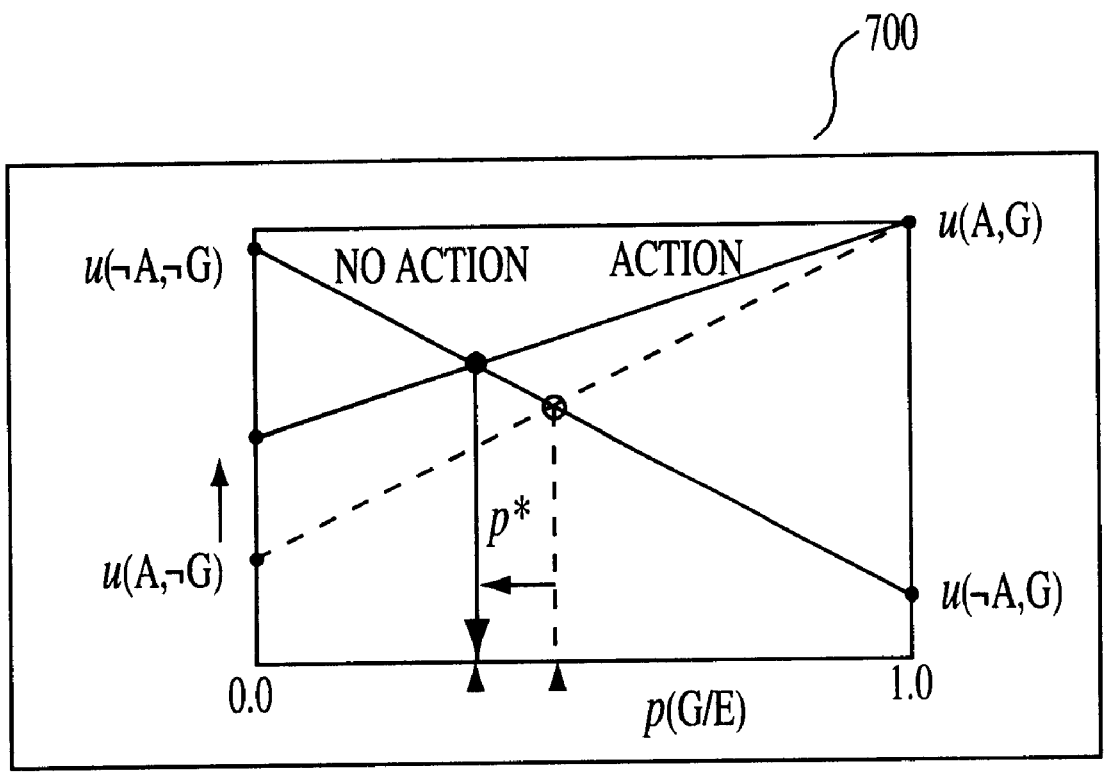
FIG. 5 is a graph in accordance with an application of decision theory that can be utilized in conjunction with embodiments of the invention.

It is also noted that the threshold probability, p*, can change dynamically as the value associated with one or more of the outcomes may be a function of the context. For example, the utility, u(A, not G), associated with the situation where a system takes action when a goal is not desired, may be greater where more screen real estate is made available. Increased screen real estate can diminish the perceived costs of the needless operation of a scheduling service that may bring up an appointment that obscures items at a user's focus of attention. FIG. 5 displays geometrically how the solution to p* can change when the utility u(A, not G) increases. As demonstrated in the graph 700 of FIG. 5, increasing the value (decreasing the cost) of acting erroneously leads to a lowering of the threshold probability that must be crossed before action occurs.

Beyond reasoning about whether to act or not to assist a user with an autonomous service, whether endowing an option of a system making a decision to ask the users about their goals is also considered. A way to integrate action for dialog into the expected utility framework is to consider the expected value of asking the user a question. Thus, the utility of these additional outcomes are considered: the case where initiate dialog about a goal and the user actually desires the goal under consideration, u(D, G), and the case where the user does not have the goal, u(D, not G). The result is shown in the graph 800 of FIG. 6, which shows the addition of a line representing the expected utility of engaging in a dialog.

As highlighted in the graph 800, the utility of engaging in a dialog with a user when the user does not have the goal in question is generally greater than the utility of performing an action when the goal is not desired. However, the utility of asking a user before performing a desired action is typically smaller than the utility of simply performing a desired action when the user indeed has the goal. In such circumstances, if the rule of selecting the option with the greatest expected utility is follow, then it is seen that action can be guided by two threshold probabilities. The two threshold probabilities are the threshold between inaction and dialog, $p^*_{not A, D}$, and the threshold between dialog and action, $p^*_{D, A}$. These two thresholds provide an instant index into whether to act, to engage the user in a dialog about action, or to do nothing, depending on the assessed likelihood of the user having a goal.

It is noted that explicit computations of expected value do not necessarily need to be performed; rather, thresholds can be directly assessed by designers or users. Such directly assessed thresholds on action imply a deeper assumed expected utility model, as those of ordinary skill within the art can appreciate.

System

Figure 7:
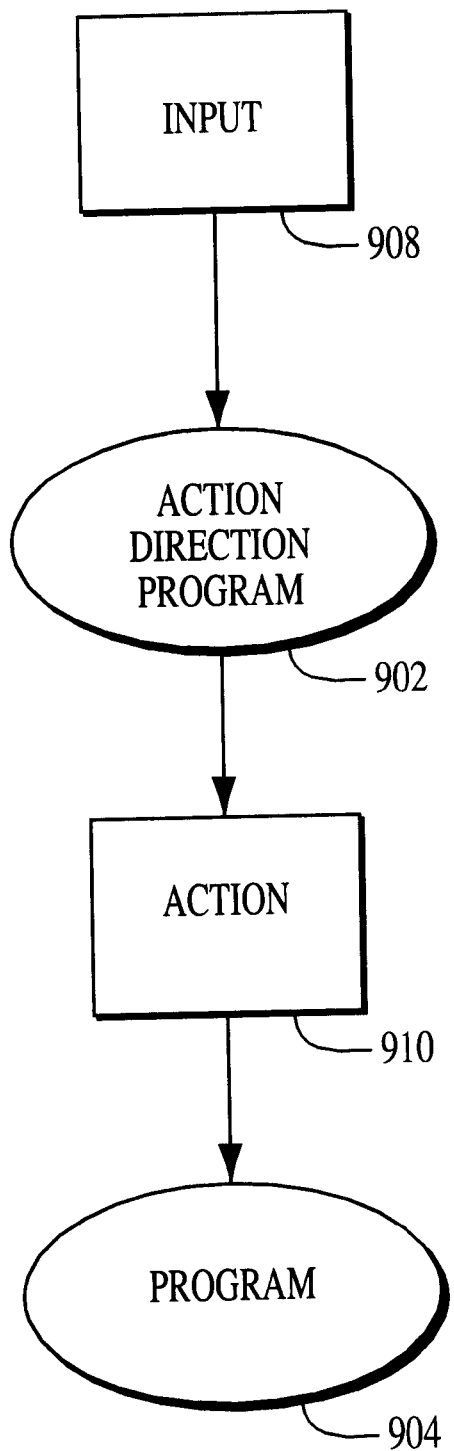

In this section of the detailed description, a system according to an embodiment of the invention is described, in conjunction with FIG. 7. The system of FIG. 7 includes an action direction program 902, and a program 904. In one embodiment, one or more of the programs 902 and 904 is a computer program executed by a processor of a computer (such as the computer described in conjunction with FIG. 1) from a computer-readable medium, such as a memory, of the computer. The action direction program 902 has an input 908, for example, from an electronic mail program (not shown in FIG. 7), or another programs (also not shown in FIG. 7). The action direction program 902 provides an action 910 as an output, which is utilized by the program 904.

The input 908 to the action direction program 902 is in one embodiment text, such as the message of an electronic mail as can be provided by an electronic mail program, although the invention is not so limited. Furthermore, the program 904 is a program that is able to perform the action 910. For example, in one embodiment the program 904 is a scheduling program in which a user is able to track appointments within a calendar, such that the action 910 includes a scheduling action that the scheduling program can act upon (e.g., a specific appointment, etc.). In this example, then, the action direction program 902 is a program in which appointments can be gleaned from the input 908 to be made in conjunction with the scheduling program.

The action direction program 902 first determines an action probability based on the input 908. Based thereon, it selects one of the following three options: (1) inaction, (2) automatic action, and (3) suggested action with user approval. If either option (2) is selected, or option (3) is selected and the user has approved the suggested action, then the action direction program 902 performs an action 910 within the program 904. In one embodiment, this determination of an action probability and the option selection based thereon is made by the program 902 in accordance with the methods previously described, although the invention itself is not necessarily so limited.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method comprising:
   determining a text to analyze;
   determining an action probability based on at least one of the text and contextual information;
   selecting an option selected from the group essentially consisting of: (1) inaction, (2) automatic action, and (3) suggested action with user approval, based on the action probability; and,
   upon selecting the option comprising one of the (1) automatic action and the (2) suggested action with user approval, the latter also in conjunction with receiving actual user approval, performing an action based on the text.

2. The method of claim 1, wherein the contextual information comprises information regarding recent user activity.

3. The method of claim 1, wherein the action comprises one of scheduling, forwarding, paging, routing and moving.

4. The method of claim 1, wherein determining a text to analyze comprises determining a message having focus.

5. The method of claim 1, wherein determining an action probability based on the text comprises inputting the text into a text classification system to determine the action probability.

6. The method of claim 5, wherein inputting the text into a text classification system comprises initially generating the text classification system.

7. The method of claim 6, wherein initially generating the text classification system comprises:

performing a feature-selection phase; and, performing a model-construction phase based on the feature-selection phase.

8. The method of claim 7, wherein performing a feature-selecting phase comprises training the text classification system by inputting a plurality of texts based on which action is to occur and inputting a plurality of texts based on which action is not to occur.

9. The method of claim 7, wherein performing a feature-selection phase comprises seeding the feature-selection phase with domain-specific knowledge.

10. The method of claim 1, wherein selecting an option comprises:

associating a boundary between the (1) and the (2) options with a first probability threshold, and a boundary between the (2) and the (3) options with a second probability threshold;

upon determining that the action probability is less than the first probability threshold, selecting the (1) option;

upon determining that the action probability is greater than the second probability threshold, selecting the (3) option; and, otherwise, selecting the (2) option.

11. The method of claim 10, wherein associating a boundary between the (1) and the (2) options with a first probability threshold, and a boundary between the (2) and the (3) options with a second probability threshold comprises utilizing decision theory to determine the first and the second probability thresholds.

12. The method of claim 11, wherein utilizing decision theory comprises utilizing cost/benefit analysis.

13. The method of claim 12, wherein utilizing cost/benefit analysis comprises utilizing the cost/benefit analysis in a contextual manner.

14. A machine-readable medium having processor instructions stored thereon for execution by a processor to cause performance of a method comprising:

determining a text to analyze;

determining an action probability based on the text;

selecting an option selected from the group essentially consisting of: (1) inaction, (2) automatic action, and (3) suggested action with user approval, based on the action probability; and, upon selecting the option comprising one of the (1) automatic action and the (2) suggested action with user approval, the latter also in conjunction with receiving actual user approval, performing an action based on the text.

15. The medium of claim 14, wherein the action comprises one of scheduling, forwarding, paging, routing and moving.

16. The medium of claim 14, wherein determining a text to analyze comprises determining a message having focus.

17. The medium of claim 14, wherein determining an action probability based on the text comprises inputting the text into a text classification system to determine the action probability.

18. The medium of claim 17, wherein inputting the text into a text classification system comprises initially generating the text classification system.

19. The medium of claim 17, wherein initially generating the text classification system comprises:

performing a feature-selection phase; and, performing a model-construction phase based on the feature-selection phase.

20. The medium of claim 19, wherein performing a feature-selecting phase comprises training the text classification system by inputting a plurality of texts based on which action is to occur and inputting a plurality of texts based on which action is not to occur.

21. The medium of claim 19, wherein performing a feature-selection phase comprises seeding the feature-selection phase with domain-specific knowledge.

22. The medium of claim 14, wherein selecting an option comprises:

associating a boundary between the (1) and the (2) options with a first probability threshold, and a boundary between the (2) and the (3) options with a second probability threshold;

upon determining that the action probability is less than the first probability threshold, selecting the (1) option;

upon determining that the action probability is greater than the second probability threshold, selecting the (3) option; and, otherwise, selecting the (2) option.

23. The medium of claim 22, wherein associating a boundary between the (1) and the (2) options with a first probability threshold, and a boundary between the (2) and the (3) options with a second probability threshold comprises utilizing decision theory to determine the first and the second probability thresholds.

24. The medium of claim 23, wherein utilizing decision theory comprises utilizing cost/benefit analysis.

25. The medium of claim 24, wherein utilizing cost/benefit analysis comprises utilizing the cost/benefit analysis in a contextual manner.

26. A computerized system comprising:

a program in which a user is able to perform an action; and, an action direction program to determine an action probability based on an input; select an option selected from the group essentially consisting of: (1) inaction, (2) automatic action, and (3) suggested action with user approval, based on the action probability; and, upon selecting the option comprising one of the (1) automatic action and the (2) suggested action with user approval, the latter also in conjunction with receiving actual user approval, performing an action within the program based on the input.

27. The system of claim 26, wherein the input of the action direction program comprises a user-provided input, such that the action direction program is user-invoked.

28. The system of claim 26, wherein the action program comprises a computer program executed by a processor from a computer-readable medium.

29. The system of claim 26, wherein the action direction program comprises a computer program executed by a processor from a computer-readable medium.

30. The system of claim 26, wherein the action comprises one of scheduling, extraction of contact information, extraction of maps or directions, forwarding, paging, routing and moving.

31. A system that facilitates automated computer action, comprising:

a component that receives information related to intentions of a user; and an action direction component that analyzes the information and makes a probabilistic determination as to a user desired action to be taken in connection with the received information.

32. The system of claim 31, the information comprising user action data.

33. The system of claim 31, the information comprising user state data.

34. The system of claim 33, the automatic action including at least one of: scheduling an appointment, scoping a calendar to appropriate ranges, forwarding a message, and sending an alert.

35. The system of claim 31, the information comprising sensory related data.

36. The system of claim 31, the action direction component determining that no computer-based action should be performed in connection with the received information.

37. The system of claim 36 further comprising a text classifier.

38. The system of claim 31, the action direction component determining that automatic computer-based action should be performed in connection with the received information.

39. The system of claim 31, the information being text.

40. The system of claim 31, the information being a message.

41. The system of claim 31, further comprising a support vector machine that is employed in connection with determining an action probability relating to the information.

42. The system of claim 31 further comprising a Bayesian network model.

43. The system of claim 31, the probabilistic determination comprising determining an expected utility of taking autonomous action.

44. The system of claim 31, the probabilistic determination comprising determining an expected utility of taking no autonomous action.

45. The system of claim 31, the probabilistic determination comprising determining an expected utility of requesting additional information from the recipient.

46. A system that facilitates automated computer action, comprising:

means for analyzing content related to intentions of a user; and means for making a probabilistic determination as to a user desired action to be taken in connection with the analyzed content.

* * * * *